Aug. 23, 1932.   A. W. KIMBELL   1,872,968
SEPARABLE FASTENER, FASTENER INSTALLATION, AND METHOD OF ATTACHING THE SAME
Filed Aug. 5, 1930   2 Sheets-Sheet 1

Inventor:
Arthur W. Kimbell
by Emery, Booth, Varney & Townsend
Attys

Aug. 23, 1932.  A. W. KIMBELL  1,872,968
SEPARABLE FASTENER, FASTENER INSTALLATION, AND METHOD OF ATTACHING THE SAME
Filed Aug. 5, 1930  2 Sheets-Sheet 2
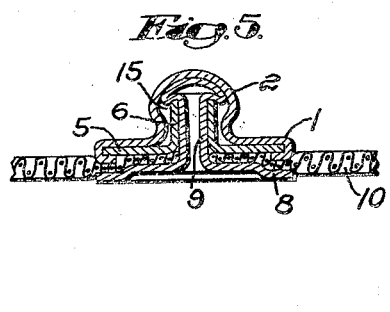
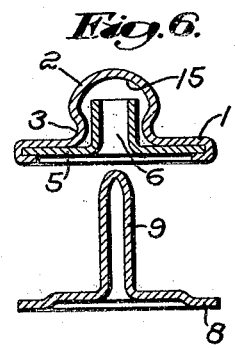
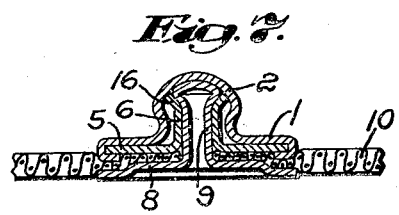
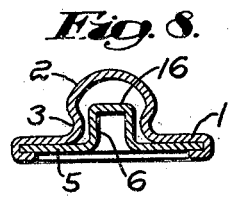
Inventor:
Arthur W. Kimbell
by Emery, Booth, Varney & Townsend
Attys Patented Aug. 23, 1932

1,872,968

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENER, FASTENER INSTALLATION, AND METHOD OF ATTACHING THE SAME

Application filed August 5, 1930. Serial No. 473,138.

My invention aims to provide improvements in separable fasteners, fastener installations and the method of attaching the same.

In the drawings which illustrate preferred embodiments of my invention:—

Figs. 5 and 6 show a third form of my invention; and

Figs. 7 and 8 show another form of my invention similar to that shown in Figs. 5 and 6, but with a closed end eyelet.

Figure 1:
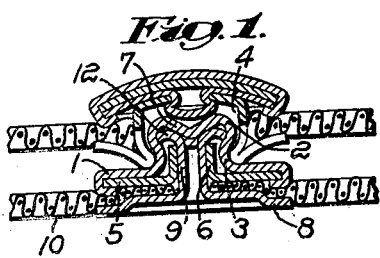
Figure 1 is a section through a snap fastener installation showing one form of my invention.

My invention is particularly, though not exclusively, adapted to snap fasteners and snap fastener installations and I have illustrated in the drawings snap fastener stud members which incorporate preferred structures and preferred methods of attachment. Therefore, I shall proceed to describe my invention with reference to the studs shown.

Heretofore, there have been several methods of attaching stud members to cloth, leather and the like and as many different constructions and assemblies of parts. However, there have been various difficulties encountered which made unsatisfactory installations. For instance, when a stud is to be attached to a piece of knitted material a much stronger installation can be obtained if the yarn is not cut by the shank of the attaching member. With any type of attaching means known to me it is practically impossible to secure, by metallic means, a stud, socket or button to knitted material without cutting the yarn and, while my invention overcomes this trouble, it is equally advantageous for use with other material due to the strength of the attachment.

Figure 2:
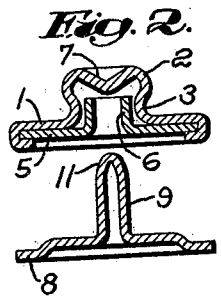
Fig. 2 is a section through the snap fastener stud and attaching member shown in Figure 1 prior to attaching them to the carrying medium.

The stud member shown in the drawings has a base 1, a hollow boss pressed from the base to provide a head 2 and a neck 3 for co-operation with a socket 4, as shown in Fig. 1. The socket may be of any suitable construction. I also use as a part of the stud unit an eyelet having a base 5 secured to the base 1 of the stud and a tubular projection 6 extending into the hollow boss and toward the head 2, as best shown in Fig. 2. In order that the best results may be secured, I provide a depression in the stud head which forms an anvil 7 extending toward the tubular projection 6 but being spaced from the end thereof.

The attaching member which I have used in the installation shown in Figure 1 is in the nature of a tack 8 having a hollow shank 9 provided with a tapered end preferably, though not necessarily, rounded at the pointed end, as best shown in Fig. 2.

My improved method of securing the stud to the carrying medium 10 is to place the stud and attaching member in a suitable mechanism between which the carrying medium 10 may be held. As the mechanism is operated to move the parts toward each other, the shank of the tack forces its way through the threads of the carrying medium without injury to the threads. Then the shank passes through the tubular projection 6 of the eyelet and is forced against the anvil 7. During the upsetting operation the closed end portion 11 of the tack is collapsed and forced into the hollow shank and is separated from the shank portion 9, as shown in Fig. 1. The shank is then spread laterally outwardly by the anvil in the same manner as though the attaching element were a tubular rivet having an open end. The outwardly turned portion 12 of the shank 9 of the attaching member is turned over the end of the tubular projection 6 of the eyelet (Figure 1), thereby providing means for holding the parts in fixed assembled relation with the carrying medium 10 which is clamped tightly between the base of the eyelet and the base of the attaching member.

The tapered end of the shank of the attaching element serves two important purposes. First, it will enter between the threads of a loosely woven material without injury to the fabric and, second, it acts as a wedge piece after it has been severed from the shank, as shown in Fig. 1, to prevent the "uncurling" of the laterally expanded portion 12 when the parts are subjected to axial stresses.

Figure 3:
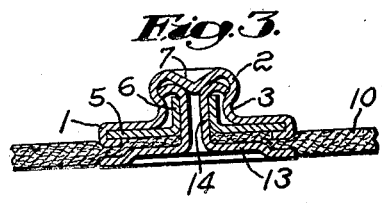
Fig. 3 is a section through a stud installation showing a second form of my invention.
Figure 4:
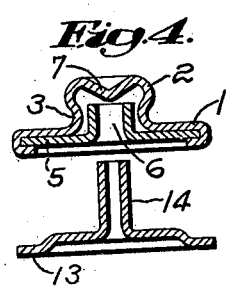
Fig. 4 is a section through the stud and rivet shown in Fig. 3 prior to attaching them to a carrying medium.

If the stud is to be attached to a carrying medium which will not unravel or pull loose, then an attaching element 13 having a tubular rivet portion 14 may be used, as shown in Figs. 3 and 4.

The tubular rivet portion 14 passes through the material, through the eyelet and has its end upset outwardly over the end of the projection 6 of the eyelet, as shown in Figure 1. While no wedge piece is present it is a satisfactory attachment for certain installations and the same stud unit may be used with either type of attaching element.

Referring now to the embodiments of my invention shown in Figs. 5 through 8, I have shown a fastener stud and installations along the lines of those described in connection with Figs. 1 to 4, except that the head of the stud is made without the depressed anvil portion. The inner surface presents a continuously curved surface 15 against which the end of a closed rivet or tack 8 is pressed to upset the end laterally over the end of the shank of the eyelet 6, as shown in Fig. 4.

Fig. 7 shows an installation which is the same as Fig. 5, except that the eyelet has a closed end 16 which may be pierced by the tapered end of the tack shank 8 and when the end of the shank is upset it is bent laterally outwardly with the pierced portion of the end 16, thereby to make a larger surface engagement between the eyelet and the shank 8 than is possible with an open ended eyelet such as shown in Fig. 5.

While I have illustrated and described particular embodiments of my invention I do not wish to be limited thereby, because the scope of my invention is best defined by the following claims.

Claims

1. A fastener installation comprising, in combination, a carrying medium, a fastener member located at one side of the carrying medium and having a hollow head, a tubular portion located within the hollow head and terminating in spaced relation to the inner surface of said head, means provided by said head for upsetting the shank of an attaching member and an attaching member having a normally closed rounded end hollow shank tapered adjacent to the end and passing through the said carrying medium, through the said tubular portion and having a portion of its end upset and expanded laterally over the end of the tubular portion and another portion wedged into the hollow shank adjacent to the free end of the tubular portion to secure the fastener member in fixed relation to the said carrying medium, the wedged portion of the rivet acting as a stop to prevent return of the laterally expanded portion through the tubular portion.

2. A snap fastener installation comprising, in combination, a carrying medium, a separable fastener member located at one side of said carrying medium and having an anvil portion and an attaching element having a hollow shank provided with a closed end forced through the carrying medium and upset by said anvil portion, said anvil portion and said shank cooperating to remove the closed end of the shank and to upset the shank in the manner of an open end rivet.

3. A snap fastener installation comprising, in combination, a carrying medium, a separable fastener member located at one side of said carrying medium and having an anvil portion, an attaching element having a hollow shank provided with a closed end forced through the carrying medium and upset by said anvil portion, said anvil portion and said shank cooperating to remove the closed end of the shank and to upset the shank in the manner of an open end rivet and an eyelet member secured to the base of the fastener member and having a tubular portion extending toward the anvil portion to provide means for cooperative engagement with the upset portion of the shank to secure the parts of the installation together.

4. A snap fastener installation comprising, in combination, a carrying medium, a separable fastener member located at one side of said carrying medium and having a head for engagement with a cooperating fastener element, an anvil portion pressed from said head, an attaching element having a hollow shank provided with a closed end forced through the carrying medium and upset by said anvil portion, said anvil portion and said shank cooperating to remove the closed end of the shank and to upset the shank in the manner of an open end rivet and an eyelet member secured to the base of the fastener member and having a tubular portion extending toward the anvil portion to provide means for cooperative engagement with the upset portion of the shank to secure the parts of the installation together.

5. The method of attaching a separable fastener member having an anvil portion to a carrying medium by means of a hollow shank attaching member having a tapered closed end which comprises forcing the hollow shank of the attaching member through the carrying medium and against the anvil portion provided by the fastener member to sever the closed end from the shank and then turn the tubular shank outwardly in the manner of upsetting a tubular open ended rivet.

6. The method of attaching a separable fastener member having an anvil portion and an eyelet to a carrying medium by means of a hollow shank attaching member having a tapered closed end which comprises forcing the hollow shank of the attaching member through the carrying medium and against the anvil portion provided by the fastener member to sever the closed end from the shank and then turn the tubular shank outwardly over the end of the eyelet in the manner of upsetting a tubular open ended rivet.

7. The method of attaching a separable fastener member having an anvil portion and an eyelet to a carrying medium by means of a hollow shank attaching member having a tapered closed end which comprises forcing the hollow shank of the attaching member through the carrying medium and against the anvil portion provided by the fastener member to sever the closed end from the shank, the said severed portion being wedged into the shank to reinforce the attachment.

In testimony whereof, I have signed my name to this specification.

ARTHUR W. KIMBELL.